United States Patent
Kawaguchi et al.

(10) Patent No.: US 11,626,020 B2
(45) Date of Patent: Apr. 11, 2023

(54) VEHICLE ALERT DEVICE

(71) Applicants: TOYOTA JIDOSHA KABUSHIKI KAISHA, Toyota (JP); Continental Automotive GmbH, Hanover (DE)

(72) Inventors: Yoshihiro Kawaguchi, Miyoshi (JP); Takuto Kumashiro, Toyota (JP); Junya Fukuta, Nisshin (JP); Ryuichi Soya, Yokohama (JP)

(73) Assignees: TOYOTA JIDOSHA KABUSHIKI KAISHA, Toyota (JP); Continental Automotive GmbH, Hanover (DE)

( * ) Notice: Subject to any disclaimer, the term of this patent is extended or adjusted under 35 U.S.C. 154(b) by 0 days.

(21) Appl. No.: 17/631,137

(22) PCT Filed: Jul. 2, 2020

(86) PCT No.: PCT/JP2020/026084
§ 371 (c)(1),
(2) Date: Jan. 28, 2022

(87) PCT Pub. No.: WO2021/020022
PCT Pub. Date: Feb. 4, 2021

(65) Prior Publication Data
US 2022/0319332 A1 Oct. 6, 2022

(30) Foreign Application Priority Data
Jul. 31, 2019 (JP) .............................. JP2019-140445

(51) Int. Cl.
*G08G 1/16* (2006.01)

(52) U.S. Cl.
CPC ............. *G08G 1/167* (2013.01); *G08G 1/166* (2013.01)

(58) Field of Classification Search
None
See application file for complete search history.

(56) References Cited

U.S. PATENT DOCUMENTS

| | | | |
|---|---|---|---|
| 9,064,408 B2 * | 6/2015 | Komoguchi | G08G 1/167 |
| 10,916,144 B2 * | 2/2021 | Kang | G08G 1/167 |

(Continued)

FOREIGN PATENT DOCUMENTS

| | | |
|---|---|---|
| JP | 09-188206 A | 7/1997 |
| JP | 2008-129974 A | 6/2008 |

(Continued)

OTHER PUBLICATIONS

International Search Report of PCT/JP2020/026084 dated Sep. 15, 2020 [PCT/ISA/210].

*Primary Examiner* — Muhammad Adnan
(74) *Attorney, Agent, or Firm* — Sughrue Mion, PLLC

(57) ABSTRACT

A vehicle alert device (10) executes alert control of determining, when a target is detected in a periphery of an own vehicle (C1), within a set calculation period, whether the target is an alert-target object that does not include a stationary object, determining, when the target is an alert-target object, whether the alert-target object exists in a blind spot area (RL, RR) of a driver, and alerting the driver when the alert-target object exists in the blind spot area. The vehicle alert device avoids executing the alert control when a relative speed of the own vehicle with respect to the alert-target object at a time when the own vehicle overtakes the alert-target object is equal to or higher than a predetermined threshold value. The vehicle alert device sets the predetermined threshold value to a larger value and sets the set calculation period to a shorter value, when a travel speed of the own vehicle at the time when the own vehicle overtakes the alert-target object is equal to or higher than a predetermined speed, than the predetermined threshold value and the set calculation period at a time when the travel speed of the own vehicle is lower than the predetermined speed.

7 Claims, 8 Drawing Sheets

(56) References Cited

U.S. PATENT DOCUMENTS

| | | | | |
|---|---|---|---|---|
| 11,514,793 | B2* | 11/2022 | Shimizu | G08G 1/166 |
| 2005/0012604 | A1* | 1/2005 | Takahashi | G08G 1/166 |
| | | | | 340/435 |
| 2012/0166017 | A1 | 6/2012 | Kobayashi et al. | |
| 2015/0161881 | A1* | 6/2015 | Takemura | G08G 1/165 |
| | | | | 348/148 |
| 2018/0158338 | A1* | 6/2018 | Kawaguchi | B60W 50/14 |
| 2018/0201192 | A1* | 7/2018 | Ishida | B60R 1/08 |
| 2018/0322788 | A1* | 11/2018 | Rogers | G01S 17/931 |
| 2019/0111843 | A1* | 4/2019 | Yamada | B60K 37/00 |
| 2020/0062277 | A1* | 2/2020 | Kim | G01S 13/931 |
| 2020/0148108 | A1* | 5/2020 | Kumashiro | E05B 77/04 |
| 2020/0164797 | A1* | 5/2020 | Akachi | G08B 3/10 |
| 2020/0391591 | A1* | 12/2020 | Kim | B60W 30/0956 |

FOREIGN PATENT DOCUMENTS

| | | |
|---|---|---|
| JP | 2011-148479 A | 8/2011 |
| WO | 2012/172591 A1 | 12/2012 |

\* cited by examiner

|  | STUDY EXAMPLE 1 | STUDY EXAMPLE 2 | STUDY EXAMPLE 3 | EXAMPLE |
|---|---|---|---|---|
| SOT CALCULATION PERIOD Tsot(s) | T1 | T1 | T2 | T2 |
| SOT CUTOFF SPEED Vrcut(m/s) | Vr1 | Vr2 | Vr2 | Vr2 |
| VEHICLE SPEED CONDITION | ABSENT | ABSENT | ABSENT | $Vs \geq Vref$ |
| UNNECESSARY OPERATION | ABSENT | ABSENT | PRESENT | ABSENT |
| DETECTION DELAY | ABSENT | PRESENT | ABSENT | ABSENT |

FIG.6

VEHICLE ALERT DEVICE

CROSS REFERENCE TO RELATED APPLICATIONS

This application is a National Stage of International Application No. PCT/JP2020/026084, filed Jul. 2, 2020, claiming priority to Japanese Patent Application No. 2019-140445, filed Jul. 31, 2019.

TECHNICAL FIELD

The present invention relates to a vehicle alert device which alerts a driver when an alert-target object, for example, another vehicle existing in a blind spot area of the driver, is detected.

BACKGROUND ART

Hitherto, there has been known an alert device for alerting a driver when an alert-target object, for example, another vehicle existing in a blind spot area of the driver, is detected. Such an alert device is referred to as, for example, "blind spot monitor (BSM)", and has been put into practical use. As illustrated in FIG. 4, the blind spot monitor has warning areas RL and RR that are areas of blind spot of the driver and are determined in advance, and operates a notification device (for example, an indicator provided on a side mirror) when even a part of another vehicle exists in the warning area RL or RR. For example, as illustrated in FIG. 4, when another vehicle C2 is traveling in parallel in a right next lane in an obliquely rearward direction of an own vehicle C1, the notification device operates to alert the driver.

Moreover, for example, as illustrated in FIG. 4, also when another vehicle C3 that is traveling in a left next lane is approaching, from afar, the own vehicle C1 from rearward, when the approaching another vehicle C3 is predicted to enter the warning area RL within a predetermined period, the notification device alerts the driver at a stage at which the other vehicle C3 has not entered the warning area RL.

Moreover, when the own vehicle overtakes another vehicle traveling in the next lane, the other vehicle enters the warning area during the overtaking. Thus, also in this case, the notification device is operated. The blind spot monitor proposed in Patent Literature 1 changes a condition for finishing the operation of the notification device in accordance with a relative speed between the own vehicle and the other vehicle when the own vehicle overtakes the other vehicle.

CITATION LIST

Patent Literature

[PTL 1] WO 2012/172591 A1

SUMMARY OF INVENTION

Such a blind spot monitor generally uses a radar sensor to detect an alert-target object, for example, another vehicle. The alert-target object is a moving object, and a stationary object is excluded. For example, when guard rails and road signs are intermittently installed, it is not preferred to alert each time such objects enter the warning area. Thus, for the blind spot monitor, the stationary object is defined as "object not to alert for." As a result, when the blind spot monitor detects a 3D object in a radar detection range, the blind spot monitor determines whether or not the 3D object (hereinafter referred to as "target") is an alert-target object, and excludes the target from alert-target objects when the target is determined as an "object not to alert for." The determination of whether or not a target is an alert-target object is hereinafter referred to as "object determination."

A certain calculation period is required for the object determination. Thus, a calculation period set in advance is secured, and a period from the detection of a target until the set calculation period elapses is used for the object determination. Thus, even when the target is detected in the warning area, it is not possible to alert the driver until the set calculation period elapses.

The set calculation period is determined based on a detection capability of the radar sensor. Reduction in the set calculation period to a period equal to or shorter than that corresponding to the detection capability leads to erroneous determination. For example, even when the target is a stationary object, the target may not be determined as a stationary object within the set calculation period. In this case, this target cannot be excluded from alert-target objects. As a result, the alert is issued for the target for which the alert is not actually required.

For example, in a scene in which the own vehicle overtakes another vehicle traveling in a next lane, the driver can recognize the other vehicle that has been traveling ahead. Thus, it is conceivable that the function of the blind spot monitor is inactivated when the own vehicle overtakes the other vehicle at high speed, and the function of the blind spot monitor is activated only when the own vehicle overtakes the other vehicle at low speed. In this case, it is only required to activate the function of the blind spot monitor in a range in which a relative speed (referred to as "overtake speed") at the time when the own vehicle overtakes another vehicle is equal to or lower than a reference speed threshold value.

As the blind spot monitor becomes widely used, the driver tends to check the activation state of the notification device (whether or not a light is turned on) every time the driver changes lanes. Thus, dependency of the driver on the blind spot monitor increases, and it is required to extend a region (operation condition) in which the function of the blind spot monitor is active.

For example, when the reference speed threshold value for the overtake speed is increased, it is possible to accordingly extend the region in which the blind spot monitor is active. However, there is a fear in that the error in the object determination may be induced, and the alert may be issued for a target that is not determined to be an alert-target object. Such unnecessary alert is hereinafter referred to as "unnecessary operation."

Description is now given of a reason for the fact that the unnecessary operation is liable to occur during the overtake when the region in which the function of the blind spot monitor is active is extended.

As described above, when the other vehicle traveling in the next lane rapidly approaching, from afar, the own vehicle from rearward (example of the other vehicle C3 shown in FIG. 4), the alert is issued to the driver at the stage at which the other vehicle has not entered the warning area. Thus, a detection axis of the radar sensor is mainly directed diagonally rearward of the vehicle (see FIG. 2). Consequently, in the scene in which the other vehicle is approaching from rearward of the own vehicle, a period in which the other vehicle stays in a radar detection area (range indicated by SR or SL in FIG. 2) is long, and the object determination can thus appropriately be made in this period.

Meanwhile, in the scene in which the own vehicle overtakes the other vehicle, the other vehicle enters the warning area substantially simultaneously with the time at which the other vehicle enters the radar detection area (ranges indicated by SR and SL in FIG. 2). Thus, there is not a time margin for the object determination.

It is required to complete the object determination before the other vehicle passes through the warning area, but, as described above, when the reference speed threshold value for the overtake speed is increased, it is required to reduce the set calculation period for the object determination, and there is fear in that the appropriate object determination may not be made within the set calculation period. That is, when the region in which the function of the blind spot monitor is active is extended (the activation condition is extended), the unnecessary operation is conversely liable to be induced. Moreover, the detection capability of the radar sensor is higher in areas closer to the center side (area closer to the radar detection axis) in the detection area, and is lower in areas closer to the outside (areas more apart from the radar detection axis) in the detection area. Also due to this fact, the unnecessary operation is liable to occur in the scene of the overtake executed on the outside area in the radar detection area.

The present invention has been made in view of the above-mentioned problem, and has an object to extend a region in which an alert function is active while preventing an increase in unnecessary operation.

According to the present invention, there is provided a vehicle alert device including: a sensor configured to detect a target existing in a periphery of an own vehicle; and control means configured to execute alert control of determining, when the target is detected by the sensor, within a set calculation period, whether the target is an alert-target object that does not include a stationary object, determining, when the target is determined to be an alert-target object, whether the alert-target object exists in a blind spot area of a driver of the own vehicle, and alerting the driver when the alert-target object is determined to exist in the blind spot area.

The control means is configured to avoid executing the alert control when a relative speed of the own vehicle with respect to the alert-target object at a time when the own vehicle overtakes the alert-target object is equal to or higher than a predetermined threshold value. Moreover, the control means is configured to set the predetermined threshold value to a larger value and set the set calculation period to a shorter value, when a travel speed of the own vehicle at the time when the own vehicle overtakes the alert-target object is equal to or higher than a predetermined speed, than the predetermined threshold value and the set calculation period at a time when the travel speed of the own vehicle is lower than the predetermined speed.

The control means of the vehicle alert device according to the present invention determines, within the set calculation period, whether the target detected in the periphery of the own vehicle is an alert-target object that does not include a stationary object. When an alert-target object exists in the blind spot area of the driver, the control means alerts the driver. For example, the control means includes a periphery sensor such as a radar sensor configured to detect a rear-side target of the own vehicle, and detects a target through use of this periphery sensor. After that, in the set calculation period, the control means determines whether the detected target is an alert-target object (object to alert for). For example, when the control means can determine that an exclusion condition (for example, a condition that the target is a stationary object) is satisfied for the detected target, the control means excludes the target from alert-target objects. Thus, the control means recognizes, as an alert-target object, a target that is not excluded.

Moreover, the control means determines, for example, whether an alert-target object exists in the blind spot area of the driver. When the control means determines that an alert-target object exists in the blind spot area, the control means alerts the driver.

Further, the control means acquires the relative speed at the time when the own vehicle overtakes an alert-target object. The control means does not execute the alert control when the relative speed is equal to or higher than the predetermined threshold value. The control means prohibits the execution of the alert when the relative speed is equal to or higher than the predetermined threshold value.

When the predetermined threshold value for the relative speed is increased, it is possible to extend the region in which the alert function is active during the overtake. However, it is required to reduce the set calculation period for determining whether a detected target is an alert-target object. Thus, determination precision decreases, and the unnecessary operation is liable to occur.

In the vehicle alert device according to the present invention, a stationary object is excluded from alert-target objects. In this case, as a relative speed between the own vehicle and the stationary object decreases, that is, a travel speed (vehicle speed) of the own vehicle decreases, it is more difficult to determine whether the detected target is a stationary object, and a determination capability thereof decreases. In other words, as the vehicle speed of the own vehicle increases, the capability of determining whether a detected target is a stationary object increases. Thus, as the vehicle speed of the own vehicle increases, even when the set calculation period required for the determination of whether a target is an alert-target object is reduced, predetermined determination precision can be maintained.

Thus, when the vehicle speed is high, the control means makes changes such that the threshold value is increased and the set calculation period is reduced compared with those at the time when the vehicle speed is low. Thus, in the case in which the vehicle speed is high compared with the case in which the vehicle speed is low, the alert can be issued more. As a result, it is possible to increase the region (operation condition) in which the alert can be issued while the unnecessary operation is prevented from increasing.

In the vehicle alert device of the present invention, in a case in which the own vehicle includes a left turn signal and a right turn signal which are configured to be turned on through operation of the driver, the control means may be configured to increase a level of the alert to the driver when the left turn signal is turned on under a state in which the alert-target object is determined to exist in the blind spot area on a left side of the own vehicle and the alert is being issued. Further, in this case, the control means may be configured to increase the level of the alert to the driver when the right turn signal is turned on under a state in which the alert-target object is determined to exist in the blind spot area on a right side of the own vehicle and the alert is being issued.

Similarly, in the case in which the own vehicle includes a left turn signal and a right turn signal which are configured to be turned on through operation of the driver, the control means may be configured to increase a level of the alert to the driver when the left turn signal is turned on, compared with the level at a time when the left turn signal is not turned on, under a state in which the alert-target object is determined to exist in the blind spot area on a left side of the own vehicle and the alert is to be issued. Further, in this case, the control means may be configured to increase the level of the alert to the driver when the right turn signal is turned on, compared with the level at the time when the right turn signal is not turned on, under a state in which the alert-target object is determined to exist in the blind spot area on a right side of the own vehicle and the alert is to be issued.

In addition, the sensor includes, for example, a left rear sensor configured to detect the target existing in a left rear area of the own vehicle, and a right rear sensor configured to detect the target existing in a right rear area of the own vehicle.

In addition, the blind spot area includes, for example, a left rear blind spot area of the own vehicle and a right rear blind spot area of the own vehicle. In this case, the left rear sensor is mounted to the own vehicle so that the left rear sensor is enabled to detect the target existing in the left rear blind spot area of the own vehicle, and the right rear sensor is mounted to the own vehicle so that the right rear sensor is enabled to detect the target existing in the right rear blind spot area of the own vehicle.

In addition, in a case in which the vehicle alert device according to the present invention further includes an indicator, the control means may be configured to alert the driver through use of the indicator.

In addition, the control means may be configured to alert the driver when the control means determines that the alert-target object predicted to enter the blind spot area from rearward of the own vehicle within a predetermined period exists.

In the description above, in order to facilitate understanding of the invention, reference symbols used in an embodiment of the present invention are enclosed in parentheses, and are assigned to each of constituent features of the invention corresponding to the embodiment. However, each of the constituent features of the invention is not limited to the embodiment prescribed by the reference symbols.

BRIEF DESCRIPTION OF DRAWINGS

FIG. 6 is a table for showing specifications and study results in Study Examples (1 to 3) and an Example.

DESCRIPTION OF EMBODIMENTS

Referring to the accompanying drawings, a vehicle alert device according to an embodiment of the present invention is described below.

Figure 1:
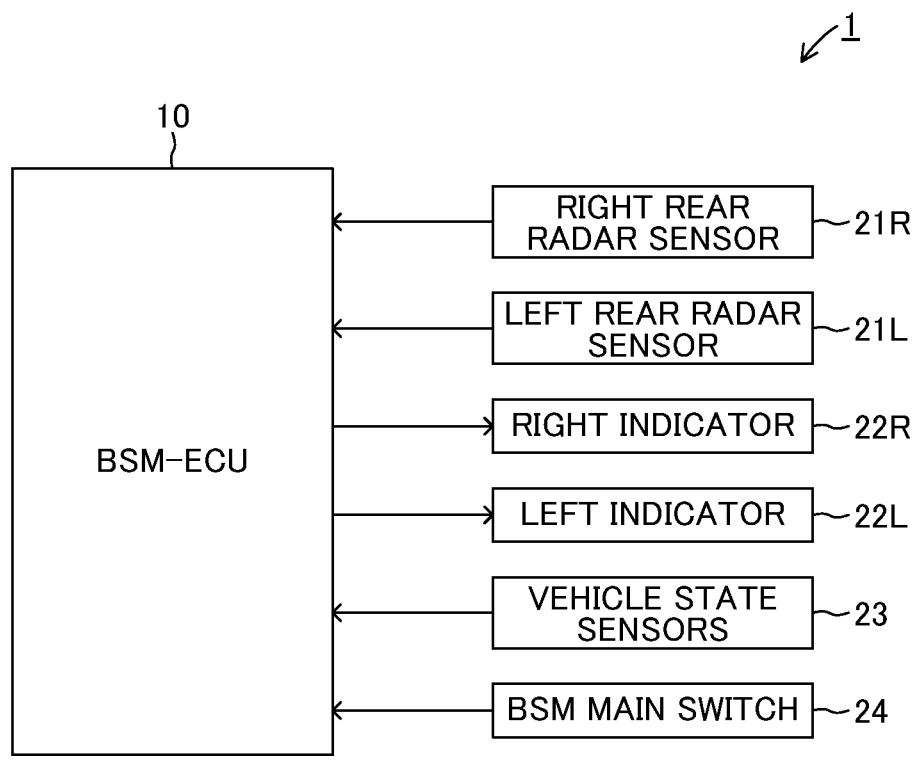
FIG. 1 is a schematic system configuration diagram of a vehicle alert device according to an embodiment of the present invention.

FIG. 1 is a diagram for illustrating a schematic system configuration of a vehicle alert device according to an embodiment of the present invention. The alert device is mounted to a vehicle (hereinafter sometimes referred to as "own vehicle" in order to distinguish the vehicle from other vehicles). The alert device is a device which is a so-called "blind spot monitor (BSM)." The alert device includes a blind spot monitor ECU 10. The blind spot monitor ECU 10 is hereinafter referred to as "BSM-ECU 10."

The BSM-ECU 10 is an electric control device (electric control unit) including a microcomputer as a principal component. The microcomputer herein includes, for example, a CPU, a ROM, a RAM, a non-volatile memory, and an interface I/F. The CPU is configured to execute instructions (programs and routines) stored in the ROM, to thereby achieve various functions.

To the BSM-ECU 10, a right rear radar sensor 21R, a left rear radar sensor 21L, a right indicator 22R, a left indicator 22L, vehicle state sensors 23, and a BSM main switch 24 are electrically connected. Moreover, the BSM-ECU 10 is electrically connected to a controller area network (CAN) (not shown), and is configured to be capable of receiving various types of information transmitted to the CAN, and transmitting information on an operation situation of the BSM-ECU 10 to the CAN.

Figure 2:
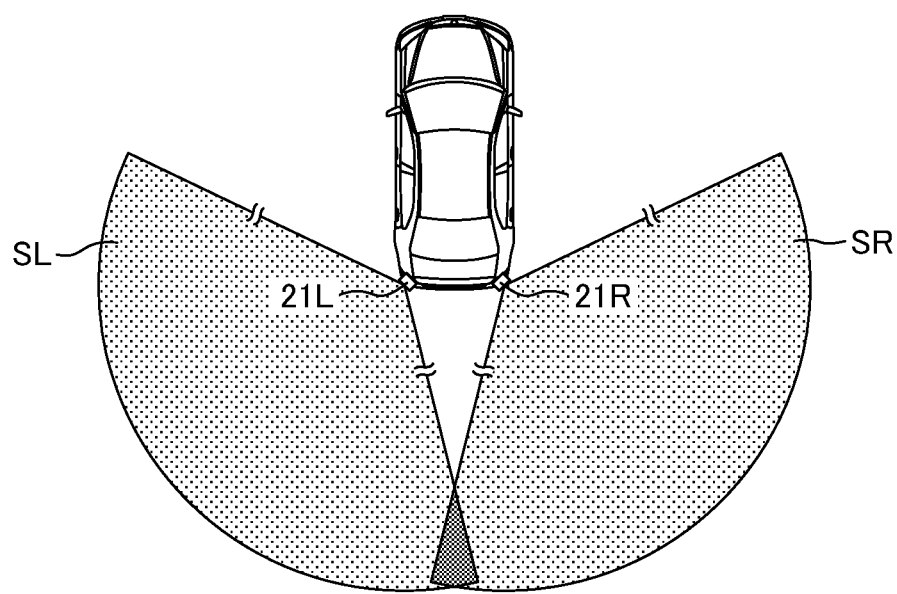
FIG. 2 is a plan view for illustrating detection angle ranges of radar sensors.

As illustrated in FIG. 2, the right rear radar sensor 21R is provided in a right rear corner portion of a vehicle body. The left rear radar sensor 21L is provided in a left rear corner portion of the vehicle body. The right rear radar sensor 21R and the left rear radar sensor 21L are different only in detection area, and have the same configurations. When it is not required to distinguish the right rear radar sensor 21R and the left rear radar sensor 21L from each other, both thereof are hereinafter referred to as "rear radar sensors 21."

Each rear radar sensor 21 includes a radar transmission/reception unit and a signal processing unit (not shown). The radar transmission/reception unit radiates a radio wave in the millimeter band (hereinafter referred to as "millimeter wave"), and receives a millimeter wave (that is, a reflected wave) reflected by a 3D object (for example, another vehicle, a pedestrian, a bicycle, and a building) existing in a radiation range. The signal processing unit detects a 3D object based on the transmitted millimeter wave (transmission wave) and the received millimeter wave (reception wave), and calculates a distance from the own vehicle to the 3D object, an orientation of the 3D object with respect to the own vehicle, and a relative speed of the 3D object with respect to the own vehicle. A 3D object detected by the rear radar sensor 21 is hereinafter referred to as "target."

For example, the rear radar sensor 21 calculates the distance from the own vehicle to the target based on a length of an elapsed period from the transmission of the millimeter wave to the reception of the reflected wave. Moreover, the rear radar sensor 21 calculates the orientation of the target with respect to the own vehicle based on the angle of the reception of the reflected wave. Further, the rear radar sensor 21 calculates the relative speed of the target with respect to the own vehicle based on a frequency change (Doppler effect) between the transmission wave and the reception wave.

The rear radar sensor 21 supplies, to the BSM-ECU 10 at a predetermined cycle, information indicating the distance (detection distance) from the own vehicle to the target, the orientation (detection orientation) of the target with respect to the own vehicle, and the relative speed (detection relative speed) of the target with respect to the own vehicle. Those pieces of information are hereinafter referred to as "radar information."

As illustrated in FIG. 2, the right rear radar sensor 21R has, as a detection area SR, a range of between left and right predetermined angles with respect to the detection axis directed right diagonally rearward from the right rear corner portion of the vehicle body. The left rear radar sensor 21L has, as a detection area SL, a range of between the left and right predetermined angles with respect to the detection axis directed left diagonally rearward from the left rear corner portion of the vehicle body. The detection area SR of the right rear radar sensor 21R includes a blind spot area (right-side blind spot area) of the driver that does not appear on the right side mirror. Moreover, the detection area SL of the left rear radar sensor 21L includes a blind spot area (left-side blind spot area) of the driver that does not appear on the left side mirror. FIG. 2 is a view for illustrating the detection angle ranges of the right rear radar sensor 21R and the left rear radar sensor 21L, and the distances in radiation directions are longer than illustrated distances.

Figure 3:
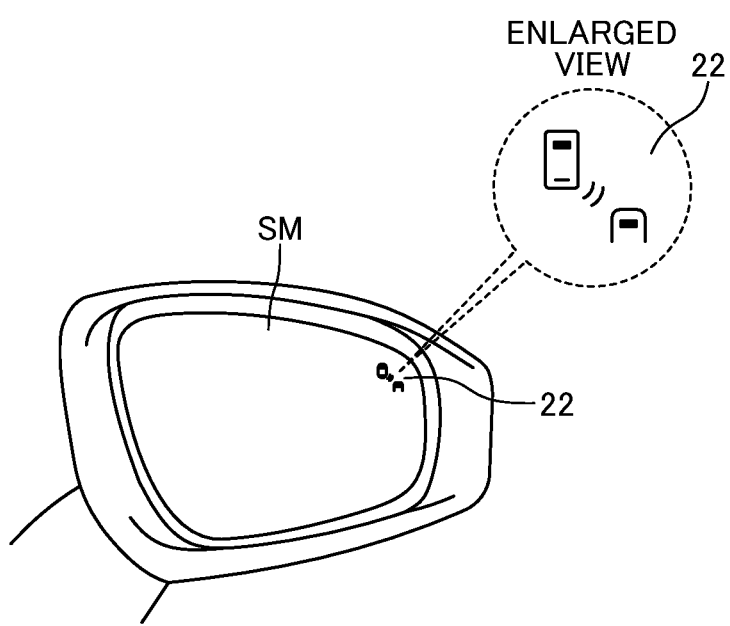
FIG. 3 is a front view of a side mirror including an indicator.

The right indicator 22R and the left indicator 22L are indicators which alert the driver. The right indicator 22R is built into the right side mirror. The left indicator 22L is built into the left side mirror. Both thereof have the same configurations. When it is not required to distinguish the right indicator 22R and the left indicator 22L from each other, both thereof are hereinafter referred to as "indicator 22." As illustrated in FIG. 3 (the right indicator 22R is illustrated), the indicator 22 is formed by building an LED into a part of an area in which a mirror of a side mirror SM is provided. In FIG. 3, on the right side thereof, an enlarged view of the indicator 22 is illustrated. The left and right indicators 22 turn on or flicker independently of each other based on a turning-on signal or a flickering signal supplied from the BSM-ECU 10.

The vehicle state sensors 23 include, for example, a vehicle speed sensor for detecting a travel speed of the vehicle, a longitudinal acceleration sensor for detecting an acceleration in a longitudinal direction of the vehicle, a lateral acceleration sensor for detecting an acceleration in a lateral direction of the vehicle, and a yaw rate sensor for detecting a yaw rate of the vehicle.

The BSM main switch 24 is an operation switch to be used by the driver to select whether the function of the blind spot monitor is activated (BSM: ON) or inactivated (BSM: OFF).

<Bsm Control>

Description is now given of BSM control processing executed by the BSM-ECU 10.

Figure 4:
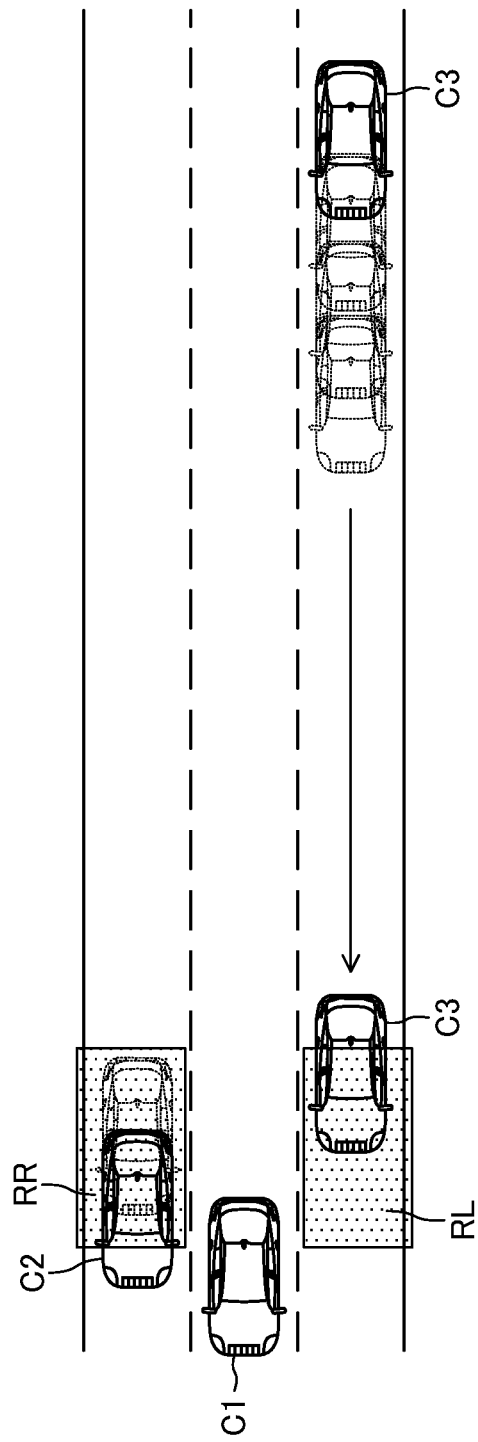
FIG. 4 is a plan view for illustrating blind spot areas and alert-target objects.

As illustrated in FIG. 4, the BSM-ECU 10 stores relative positions between the right warning area RR and the left warning area RL with respect to the own vehicle C1. The right warning area RR is set in advance so that the right warning area RR includes an area (corresponding to the blind spot of the driver) that does not appear on the right side mirror. The left warning area RL is set in advance so that the left warning area RL includes an area (corresponding to the blind spot of the driver) that does not appear on the left side mirror. When it is not required to distinguish the right warning area RR and the left warning area RL from each other, both thereof are referred to as "warning area R." The warning area R is, for example, set to a range of from 0.5 m to 3.5 m outward with respect to the left or right side surface of the vehicle body in the vehicle lateral direction, and a range of from 1 m in the forward direction to 4 m in the rearward direction with respect to the vehicle body rear end in the vehicle longitudinal direction.

The BSM-ECU 10 determines whether or not a target, for example, another vehicle (another traveling vehicle), for which alert is to be issued to the driver exists in the warning areas R based on the radar information supplied from the rear radar sensors 21. In this case, the BSM-ECU 10 sets a moving object such as another vehicle as an "object to alert for," and sets a stationary object such as a guard rail, a road sign, or a stopping vehicle as an "object not to alert for."

When a target is detected by the rear radar sensor 21 (when a 3D object enters the radar detection area), the BSM-ECU 10 determines whether or not the target is an alert-target object. In this case, the BSM-ECU 10 determines whether or not the detected target is an "object not to alert for." That is, the BSM-ECU 10 determines whether or not the target is a stationary object. When the BSM-ECU 10 determines that the target is an "object not to alert for," that is, determines that there is satisfied an exclusion condition being a condition satisfied when the target is to be excluded from alert-target objects (a condition satisfied when the target is a stationary object), the BSM-ECU 10 excludes the target from alert-target objects. The BSM-ECU 10 sets a target that is not determined as an "object not to alert for" as an alert-target object, and monitors this alert-target object to determine whether or not this alert-target object exists in the warning area R.

When a target is detected by the rear radar sensor 21, the BSM-ECU 10 determines whether or not this target is an alert-target object as described above in a set calculation period T set in advance. When the set calculation period T has elapsed, the BSM-ECU 10 fixes the determination of whether or not the target is an alert-target object. Thus, a target for which the exclusion condition is not satisfied within the set calculation period is determined as an alert-target object. The alert-target object is an alert-target object only in the BSM control, and is not common to an alert-target object in other driving assist control. The alert-target object is hereinafter sometimes referred to as "another vehicle" or "the other vehicle." Moreover, the determination of whether or not a target is an alert-target object is hereinafter referred to as "object determination."

The object determination is executed based on the radar information and information on the own vehicle detected by the vehicle state sensors 23. For the object determination, calculation precision of the relative speed of the target with respect to the own vehicle is important. The relative speed is calculated through use of the Doppler effect. In the case in which the vehicle speed of the own vehicle is high, compared with the case in which the vehicle speed is low, the relative speed of the own vehicle with respect to a stationary object is high, and the Doppler effect is thus more likely to be provided (frequency change amount is likely large). Conversely, in the case in which the vehicle speed of the own vehicle is low, compared with the case in which the vehicle speed is high, the relative speed of the own vehicle with respect to a stationary object is low, and the Doppler effect is thus less likely to be provided (frequency change amount is small). Accordingly, the object determination (determination of whether or not the target is a stationary object) can more precisely be executed in the case in which the vehicle speed is high compared with the case in which the vehicle speed is low.

When the BSM-ECU 10 determines that an alert-target object exists in the warning area R, the BSM-ECU 10 turns on the indicator 22 to alert the driver. That is, the BSM-ECU 10 notifies the driver of the existence of the alert-target object. For example, as illustrated in FIG. 4, when another vehicle C2 is traveling in parallel in the right lane next to the travel lane of the own vehicle C1, the BSM-ECU 10 turns on the right indicator 22R while the other vehicle C2 is in the right warning area RR.

Moreover, the BSM-ECU 10 determines, based on the radar information detected by the rear radar sensors 21, whether or not there exists another vehicle (alert-target object) predicted to enter the warning area R within a predetermined period. When the BSM-ECU 10 determines that there exists another vehicle predicted to enter the warning area R within the predetermined period, the BSM-ECU 10 turns on the indicator 22 to alert the driver. That is, the BSM-ECU 10 notifies the driver of the existence of the other vehicle that is rapidly approaching. For example, as illustrated in FIG. 4, when there is detected another vehicle C3 that is rapidly approaching the left warning area RL in the left lane next to the travel lane of the own vehicle C1, the BSM-ECU 10 turns on the left indicator 22L.

Moreover, the BSM-ECU 10 reads a turn signal operation signal transmitted to the CAN (not shown) under the situation in which the indicator 22 is turned on. After that, when the received turn signal corresponds to the same side (the right side for the right indicator 22R and the left side for the left indicator 22L) of the indicator 22 being turned on, that is, the received turn signal corresponds to the side on which the alert-target object exists, the BSM-ECU 10 flickers the indicator 22 being turned on (turned on→flickering).

Under the situation in which the indicator 22 is turned on, when the driver attempts to change lanes toward the direction of the existing alert-target object and thus executes the turn signal operation, the indicator 22 flickers. As a result, an alert level for the driver can be increased. This configuration allows the driver to check whether or not the steering wheel operation can safely be executed, to thereby be capable of causing the driver to give up the steering wheel operation in accordance with the situation.

Figure 5:
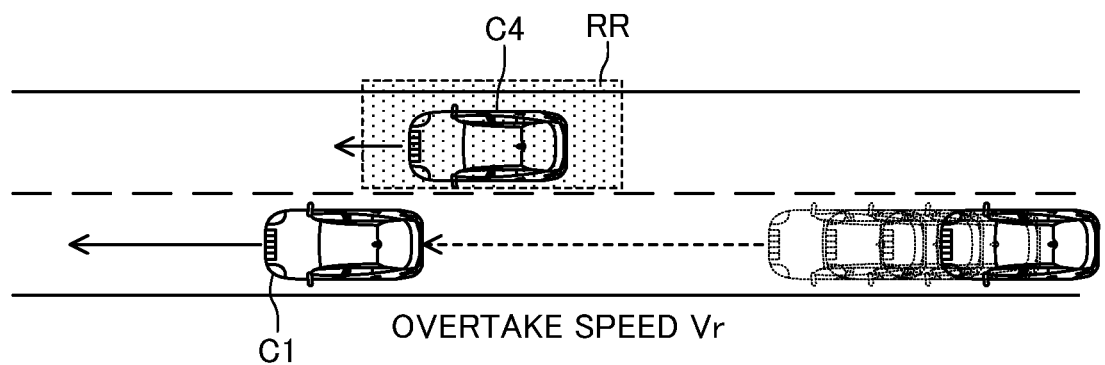
FIG. 5 is a plan view for illustrating an overtake situation.

Also in the case in which the own vehicle overtakes another vehicle, the other vehicle enters the warning area R. FIG. 5 is a diagram of an example thereof for illustrating a situation in which the own vehicle C1 is overtaking another vehicle C4 traveling on the right next lane, and the other vehicle C4 is in the right warning area RR. Also in this situation, when the other vehicle C4 is in the right warning area RR, the alert is issued by turning on the right indicator 22R.

However, when the own vehicle overtakes another vehicle, a limit is imposed on the alert operation in accordance with an overtake speed Vr at the time when the own vehicle overtakes the other vehicle. The overtake speed Vr is a relative speed between the own vehicle and the other vehicle. It is assumed that the relative speed in a direction toward which the own vehicle travels away from another vehicle in the travel direction indicates a positive value.

In the scene in which the own vehicle overtakes another vehicle, the other vehicle enters the warning area R substantially simultaneously with the time at which the other vehicle enters the radar detection area (ranges indicated by SR or SL of FIG. 2). Thus, the object determination is started substantially simultaneously with the entrance of the other vehicle in the warning area R. Thus, when the overtake speed Vr is high, the other vehicle exits the warning area R before the set calculation period T in which the object determination is made elapses. That is, the detection delay occurs.

Thus, in the scene in which the own vehicle overtakes another vehicle, in consideration of the detection capability of the rear radar sensors 21, an operation condition of the function of the blind spot monitor is limited so that the function of the blind spot monitor operates only when the overtake speed Vr is equal to or lower than a speed set in advance. An upper limit value of the overtake speed Vr for this operation condition is referred to as "SOT cutoff speed Vrcut." The function of the blind spot monitor is limited so that the function operates only when the overtake speed Vr is equal to or lower than the SOT cutoff speed Vrcut. Thus, when the overtake speed Vr is higher than the SOT cutoff speed Vrcut, the function is limited so that the blind spot monitor does not operate. "SOT" is an abbreviation of "subject overtake target."

As described above, the precision of the object determination decreases as the vehicle speed of the own vehicle decreases. When the set calculation period T to be used for the object determination is increased, unnecessary operation (operation of issuing the alert for even a stationary object for which the alert is not required) can be reduced, but the detection delay occurs.

Thus, when a test or the like is conducted to obtain the shortest period of the set calculation period T that does not cause the unnecessary operation at even a low vehicle speed, a value of the SOT cutoff speed Vrcut that does not cause the detection delay can be obtained. The set operation period T for the object determination is hereinafter referred to as "SOT calculation period Tsot."

In this case, it is possible to reduce the operation limit on the blind spot monitor by increasing the SOT cutoff speed Vrcut as high as possible. That is, the region in which the function of the blind spot monitor is active can be increased.

FIG. 6 is a table for showing, as a list, whether or not the unnecessary operation and the detection delay occur for settings of the SOT calculation period Tsot, the SOT cutoff speed Vrcut, and the vehicle speed condition.

Study Example 1 is an Example in which T1 is the shortest period of the SOT calculation period Tsot that does not cause the unnecessary operation (the unnecessary operation is suppressed within an allowable range) even at a low vehicle speed, and Vr1 is the maximum SOT cutoff speed Vrcut at which the detection delay does not occur in the SOT calculation period T1. As the detection capability of the rear radar sensor 21 increases, the SOT calculation period T1 can be reduced, and the SOT cutoff speed Vr1 can be increased. For example, the SOT calculation period T1 is approximately one second.

When the SOT calculation period T1 is determined, the SOT cutoff speed Vr1 can be set. For example, when the length in the longitudinal direction of the warning area R is L (m), a value obtained by dividing L(m) by the SOT calculation period T1 (s) may be set to the SOT cutoff speed Vr1 (m/s). As a result, there can be set the highest SOT cutoff speed Vr1 at which the other vehicle does not pass through the warning area R within the SOT calculation period T1. That is, there can be set the highest SOT cutoff speed Vr1 that does not cause the detection delay.

Study Example 2 is an Example in which the value of the SOT cutoff speed Vrcut is set to a value Vr2 that is higher than the value Vr1 of Study Example 1 (Vr2>Vr1). In Study Example 2, the region in which the function of the blind spot monitor is active can be extended compared with Study Example 1, but the detection delay occurs.

Study Example 3 is an Example in which the value of the SOT calculation period Tsot is set to a value T2 that is smaller than the value T1 of Study Examples 1 and 2 (T2<T1). In Study Example 3, the region in which the function of the blind spot monitor is activated can be extended as in the case with Study Example 2. However, the object determination cannot appropriately be executed in the SOT calculation period T2, and even a stationary object for which the alert is not required may be set as an alert-target object. Thus, the unnecessary operation occurs.

Thus, in this embodiment, as in the Example shown in FIG. 6, a vehicle speed condition is further added to Study Example 2. That is, there is added a condition that the vehicle speed Vs detected by the vehicle speed sensor is equal to or higher than the threshold value Vs1. This threshold value Vs1 is referred to as "cutoff switching vehicle speed threshold value Vref."

For the object determination, calculation precision of the relative speed of the target with respect to the own vehicle is important. The relative speed is calculated through use of the Doppler effect. In the case in which the vehicle speed of the own vehicle is high, compared with the case in which the vehicle speed is low, the relative speed of a stationary object with respect to the own vehicle is high, and the Doppler effect is thus more likely to be provided. Conversely, in the case in which the vehicle speed of the own vehicle is low, compared with the case in which the vehicle speed is high, the relative speed of a stationary object with respect to the own vehicle is low, and the Doppler effect is thus less likely to be provided. Thus, the determination of whether or not the target is a stationary object can precisely be executed in the case in which the vehicle speed is high compared with the case in which the vehicle speed is low. As a result, the object determination can be executed in a short period.

Thus, in this embodiment, only when the vehicle speed Vs is equal to or higher than the cutoff switching vehicle speed threshold value Vref set in advance, the value of the SOT calculation period Tsot is set to T2, and the value of the SOT cutoff speed Vrcut is set to Vr2, to thereby operate the blind spot monitor. For example, the value T2 of the SOT calculation period Tsot is set to substantially a half of the value T1. When the vehicle speed Vs is lower than the cutoff switching vehicle speed threshold value Vref, the blind spot monitor is operated at the setting (Tsot=T1 and Vrcut=Vr1) of Study Example 1.

The cutoff switching vehicle speed threshold value Vref is only required to be determined by setting the value of the SOT calculation period Tsot to T2, setting the value of the SOT cutoff speed Vrcut to Vr2, and testing the occurrence situations of the unnecessary operation and the detection delay for a plurality of vehicle speeds Vs. For example, when the lowest value of the vehicle speed at which the unnecessary operation and the detection delay do not occur (the occurrence of the unnecessary operation and the detection delay is suppressed within an allowable range) is set to the cutoff switching vehicle speed threshold value Vref, the region in which the function of the blind spot monitor is active can maximally be extended.

<SOT Cutoff Speed Setting Routine>

Figure 7:
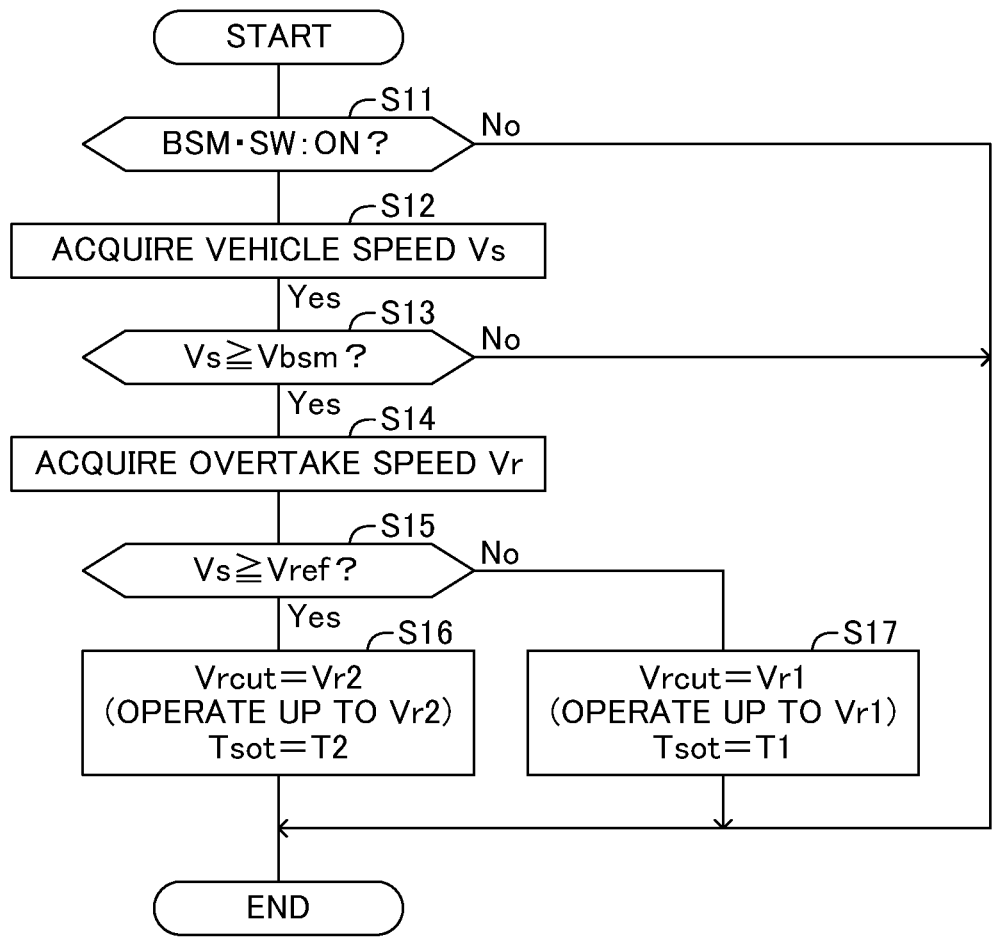
FIG. 7 is a flowchart for illustrating an SOT cutoff speed setting routine.

Description is now given of processing of switching the value of the SOT cutoff speed Vrcut. FIG. 7 is a flowchart for illustrating an SOT cutoff speed setting routine executed by the BSM-ECU 10. The BSM-ECU 10 repeats the SOT cutoff speed setting routine at a predetermined calculation cycle.

The above-mentioned value Vr1 of the SOT cutoff speed Vrcut is hereinafter referred to as "first SOT cutoff speed Vr1." The above-mentioned value Vr2 of the SOT cutoff speed Vrcut is hereinafter referred to as "second SOT cutoff speed Vr2."

When the SOT cutoff speed setting routine is started, in Step S11, the BSM-ECU 10 determines whether or not the BSM main switch 24 is in the ON state. When the BSM main switch 24 is set to the OFF state through the selection operation of the driver, the function of the blind spot monitor is set not to operate, and hence the BSM-ECU temporarily finishes the SOT cutoff speed setting routine.

When the BSM main switch 24 is in the ON state (Yes in Step S11), the BSM-ECU 10 advances its process to Step S12, and reads the current vehicle speed Vs detected by the vehicle speed sensor. After that, in Step S13, the BSM-ECU 10 determines whether or not the vehicle speed Vs is equal to or higher than a BSM operation threshold value Vbsm. The BSM operation threshold value Vbsm is a vehicle speed threshold value set as a condition (lowest speed condition) at which the function of the blind spot monitor is active, and is, for example, 10 km/h.

When the vehicle speed Vs is lower than the BSM operation threshold value Vbsm (No in Step S13), the BSM-ECU 10 temporarily finishes the SOT cutoff speed setting routine. Meanwhile, when the speed Vs is equal to or higher than the BSM operation threshold value Vbsm (Yes in Step S13), the BSM-ECU 10 advances its process to Step S14.

In Step S14, the BSM-ECU 10 acquires the current overtake speed Vr based on the radar information supplied from the rear radar sensors 21. After that, the BSM-ECU 10 advances its process to Step S15, and determines whether or not the vehicle speed Vs is equal to or higher than the cutoff switching vehicle speed threshold value Vref. When the vehicle speed Vs is equal to or higher than the cutoff switching vehicle speed threshold value Vref (Yes in Step S15), the BSM-ECU 10 advances its process to Step S16, and sets the value of the SOT cutoff speed Vrcut to Vr2 (second SOT cutoff speed Vr2). In this case, the BSM-ECU 10 accordingly sets the value of the SOT calculation period Tsot to the above-mentioned T2.

Meanwhile, when the vehicle speed Vs is lower than the cutoff switching vehicle speed threshold value Vref (No in Step S15), the BSM-ECU 10 advances its process to Step S17, and sets the value of the SOT cutoff speed Vrcut to Vr1 (first SOT cutoff speed Vr1). In this case, the BSM-ECU 10 accordingly sets the value of the SOT calculation period Tsot to the above-mentioned T1 (T1>T2).

The BSM-ECU 10 sets the value of the SOT cutoff speed Vrcut, and then, temporarily finishes the SOT cutoff speed setting routine. The BSM-ECU 10 repeats the SOT cutoff speed setting routine at the predetermined calculation cycle.

Figure 8:
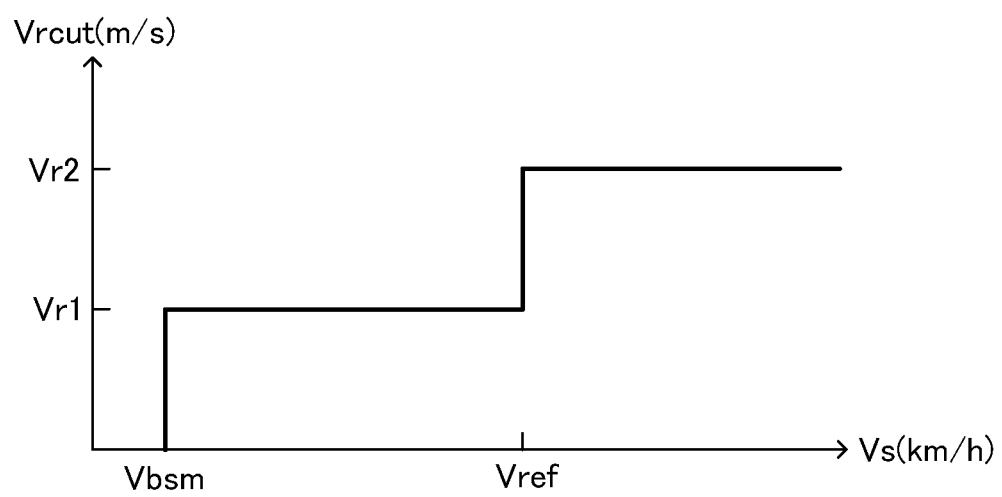
FIG. 8 is a map for showing a relationship between a vehicle speed and the SOT cutoff speed.

FIG. 8 shows a relationship between the vehicle speed Vs and the SOT cutoff speed Vrcut set by the SOT cutoff speed setting routine. The value of the SOT cutoff speed Vrcut is set to the first SOT cutoff speed Vr1 when the vehicle speed Vs is equal to or higher than the BSM operation threshold value Vbsm and lower than the cutoff switching vehicle speed threshold value Vref, and is set to the second SOT cutoff speed Vr2 when the vehicle speed Vs is equal to or higher than the cutoff switching vehicle speed threshold value Vref.

When the overtake speed Vr is higher than the SOT cutoff speed Vrcut, the BSM-ECU 10 stops the function of the blind spot monitor (stops the alert). Thus, for example, when the value of the SOT cutoff speed Vrcut is set to the second SOT cutoff speed Vr2 in Step S16, the function of the blind spot monitor is active in a range in which the overtake speed Vr is not higher than the second SOT cutoff speed Vr2. Further, when the value of the SOT cutoff speed Vrcut is set to the first SOT cutoff speed Vr1 in Step S17, the function of the blind spot monitor is active in a range in which the overtake speed Vr is not higher than the first SOT cutoff speed Vr1.

As described above, as the speed Vs increases, the object determination can be made in a shorter period. Thus, when the vehicle speed Vs is equal to or higher than the cutoff switching vehicle speed threshold value Vref, the value of the SOT calculation period Tsot can be set to the value T2 shorter than the value T1 at the time when the vehicle speed Vs is lower than the cutoff switching vehicle speed threshold value Vref.

Accordingly, in the case in which the vehicle speed Vs is equal to or higher than the cutoff switching vehicle speed threshold value Vref, even when the value of the SOT cutoff speed Vrcut is set to the value Vr2 higher than the value Vr1 at the time when the vehicle speed Vs is lower than the cutoff switching vehicle speed threshold value Vref, the detection delay does not occur.

As a result, in the case in which the vehicle speed Vs is equal to or higher than the cutoff switching vehicle speed threshold value Vref, the SOT calculation period Tsot can be reduced, and the SOT cutoff speed Vrcut can be increased compared with the case in which the vehicle speed Vs is lower than the cutoff switching vehicle speed threshold value Vref. Consequently, according to this embodiment, the region in which the blind spot monitor is active can be extended while the alert-target objects are appropriately detected.

In the above, the vehicle alert device according to the embodiment has been described, but the present invention is not limited to the above-mentioned embodiment, and various changes are possible within the range not departing from the object of the present invention.

For example, in this embodiment, the SOT cutoff speed Vrcut is set at the two stages, but is not always required to be set at the two stages, and may be set at three or more stages in accordance with the vehicle speed Vs. Moreover, the SOT cutoff speed Vrcut may linearly be increased in accordance with the vehicle speed Vs. In this case, it is preferred that the SOT calculation period Tsot be also adjusted so that the SOT calculation period Tsot is reduced as the SOT cutoff speed Vrcut increases.

Moreover, in this embodiment, the alert is issued to the driver through the operation of the indicator 22, but the alert may be issued to the driver through sound such as buzzer sound or sound announcement, in place of or in addition to the operation of the indicator 22. Moreover, physical vibration such as vibration of the steering wheel or vibration of a driver's seat may be transmitted to the driver, to thereby alert the driver.

Moreover, the indicators 22 are provided by building the indicators 22 into the side mirrors in this embodiment, but, in place of this configuration, the indicators 22 may be provided in, for example, a cabin (in, for example, left and right A pillars).

The invention claimed is:

1. A vehicle alert device, comprising:
   a sensor configured to detect a target existing in a periphery of an own vehicle; and
   control means configured to execute an alert control of determining, when the target is detected by the sensor, within a set calculation period, whether the target is an alert-target object that does not include a stationary object, determining, when the target is determined to be an alert-target object, whether the alert-target object exists in a blind spot area of a driver of the own vehicle, and alerting the driver when the alert-target object is determined to exist in the blind spot area,
   wherein the control means is configured to:
      avoid executing the alert control when a relative speed of the own vehicle with respect to the alert-target object at a time when the own vehicle overtakes the alert-target object is equal to or higher than a predetermined threshold value; and
      set the predetermined threshold value to a larger value and set the set calculation period to a shorter value, when a travel speed of the own vehicle at the time when the own vehicle overtakes the alert-target object is equal to or higher than a predetermined speed, than the predetermined threshold value and the set calculation period at a time when the travel speed of the own vehicle is lower than the predetermined speed.

2. The vehicle alert device according to claim 1,
   wherein the own vehicle includes a left turn signal and a right turn signal which are configured to be turned on through operation of the driver, and
   wherein the control means is configured to:
      increase a level of the alert to the driver when the left turn signal is turned on under a state in which the alert-target object is determined to exist in the blind spot area on a left side of the own vehicle and the alert is being issued, and
      increase the level of the alert to the driver when the right turn signal is turned on under a state in which the alert-target object is determined to exist in the blind spot area on a right side of the own vehicle and the alert is being issued.

3. The vehicle alert device according to claim 1,
   wherein the own vehicle includes a left turn signal and a right turn signal which are configured to be turned on through operation of the driver, and
   wherein the control means is configured to:
      increase a level of the alert to the driver when the left turn signal is turned on, compared with the level at a time when the left turn signal is not turned on, under a state in which the alert-target object is determined to exist in the blind spot area on a left side of the own vehicle and the alert is to be issued, and
      increase the level of the alert to the driver when the right turn signal is turned on, compared with the level at a time when the right turn signal is not turned on, under a state in which the alert-target object is determined to exist in the blind spot area on a right side of the own vehicle and the alert is to be issued.

4. The vehicle alert device according to claim 1, wherein the sensor includes a left rear sensor configured to detect target existing in a left rear area of the own vehicle, and a right rear sensor configured to detect the target existing in a right rear area of the own vehicle.

5. The vehicle alert device according to claim 4,
   wherein the blind spot area includes a left rear blind spot area of the own vehicle and a right rear blind spot area of the own vehicle,
   wherein the left rear sensor is mounted to the own vehicle so that the left rear sensor is enabled to detect the target existing in the left rear blind spot area of the own vehicle, and
   wherein the right rear sensor is mounted to the own vehicle so that the right rear sensor is enabled to detect the target existing in the right rear blind spot area of the own vehicle.

6. The vehicle alert device according to claim 1, further comprising an indicator,
   wherein the control means is configured to alert the driver through use of the indicator.

7. The vehicle alert device according to claim 1, wherein the control means is configured to alert the driver when the control means determines that the alert-target object predicted to enter the blind spot area from rearward of the own vehicle within a predetermined period exists.

\* \* \* \* \*